United States Patent
Woods et al.

(10) Patent No.: US 11,475,328 B2
(45) Date of Patent: Oct. 18, 2022

(54) DECOMPOSED MACHINE LEARNING MODEL EVALUATION SYSTEM

(71) Applicant: Cisco Technology, Inc., San Jose, CA (US)

(72) Inventors: Bronwyn Lewisia Woods, Pittsburgh, PA (US); Stefano Meschiari, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 396 days.

(21) Appl. No.: 16/818,628

(22) Filed: Mar. 13, 2020

(65) Prior Publication Data

US 2021/0287115 A1    Sep. 16, 2021

(51) Int. Cl.
    G06F 15/16    (2006.01)
    G06N 5/04     (2006.01)
    G06N 20/00    (2019.01)

(52) U.S. Cl.
    CPC ............... *G06N 5/04* (2013.01); *G06N 20/00* (2019.01)

(58) Field of Classification Search
    CPC .................................. G06N 20/00; G06N 5/04
    USPC ......................................................... 709/203
    See application file for complete search history.

(56) References Cited

U.S. PATENT DOCUMENTS

| | | | |
|---|---|---|---|
| 11,301,762 B1* | 4/2022 | Chen | G06N 20/00 |
| 11,341,367 B1* | 5/2022 | Barbosa | H04L 67/51 |
| 2019/0102361 A1* | 4/2019 | Muralidharan | G06Q 10/04 |
| 2019/0156244 A1* | 5/2019 | Faulhaber, Jr | G06N 20/00 |

OTHER PUBLICATIONS

"MLflow Tracking", online: https://mlflow.org/docs/latest/tracking.html, Jun. 5, 2018, 20 pages, Databricks.
Ratner, et al., "Snorkel: Rapid Training Data Creation with Weak Supervision", Proceedings of the VLDB Endowment, vol. 11, No. 3, Nov. 2017, pp. 269-282, VLDB Endowment.
Varma, et al., "Snuba: Automating Weak Supervision to Label Training Data", Proceedings of the VLDB Endowment, vol. 12, No. 3, Nov. 2018, pp. 223-236, VLDB Endowment.

* cited by examiner

*Primary Examiner* — Duyen M Doan
(74) *Attorney, Agent, or Firm* — Behmke Innovation Group LLC; Kenneth J. Heywood; Jonathon P. Western

(57) ABSTRACT

In one embodiment, a machine learning model evaluation system may define standardized, extensible class hierarchies for evaluating performance of a given machine learning model. The class hierarchies may include a plurality of target classes that formalize an expected output of the given machine learning model based on a given dataset, a plurality of output classes that formalize an actual output of the given machine learning model based on the given dataset, a plurality of metric classes that formalize a comparison of the expected output of the given machine learning model with the actual output of the given machine learning model, and a plurality of datasets. When a machine learning model is received for evaluation, the system may identify a target class, an output class, and a metric class that are applicable to the machine learning model. The system may also retrieve a dataset applicable to the machine learning model.

20 Claims, 7 Drawing Sheets

DECOMPOSED MACHINE LEARNING MODEL EVALUATION SYSTEM

TECHNICAL FIELD

The present disclosure relates generally to the evaluation of machine learning models, and, more particularly, to decomposed machine learning model evaluation systems.

BACKGROUND

Training a machine learning model to make accurate predictions is a necessary step in implementing and deploying many machine learning models. For example, in the context of network monitoring and assurance, an incorrect prediction that a network path will fail may lead to its traffic being needlessly rerouted onto a different path. More specifically, rerouting traffic can often impinge on the performance of the traffic by increasing delays, potential drops, jitter, etc.

The generation of a machine learning model typically entails defining a question, creating a solution, interpreting and evaluating the results, comparing those results to other solutions, and, often, iterating on the question definition to begin the cycle again. Subsequently, it is important to evaluate the performance or accuracy of the model in response to new, previously unseen (i.e., "out-of-sample") data, to ensure long-term reliability. In other words, machine learning models are often tested using a series of experiments, to assess their efficacies before deployment.

Replication of a given experiment to test different models is relatively straightforward, so long as the models, testing conditions, and model parameters are similar. However, consider the case in which model A has been trained to assess a given metric and model B has been trained to assess a different, but related, metric. In such a case, simply replicating the experiments performed for model A using model B may be insufficient and necessitate the design of an entirely new experiment for model B. While this approach is common today, it is also time consuming, susceptible to human error, and ignores the fact that at least some elements of the experiment for model A can be reused to evaluate model B.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
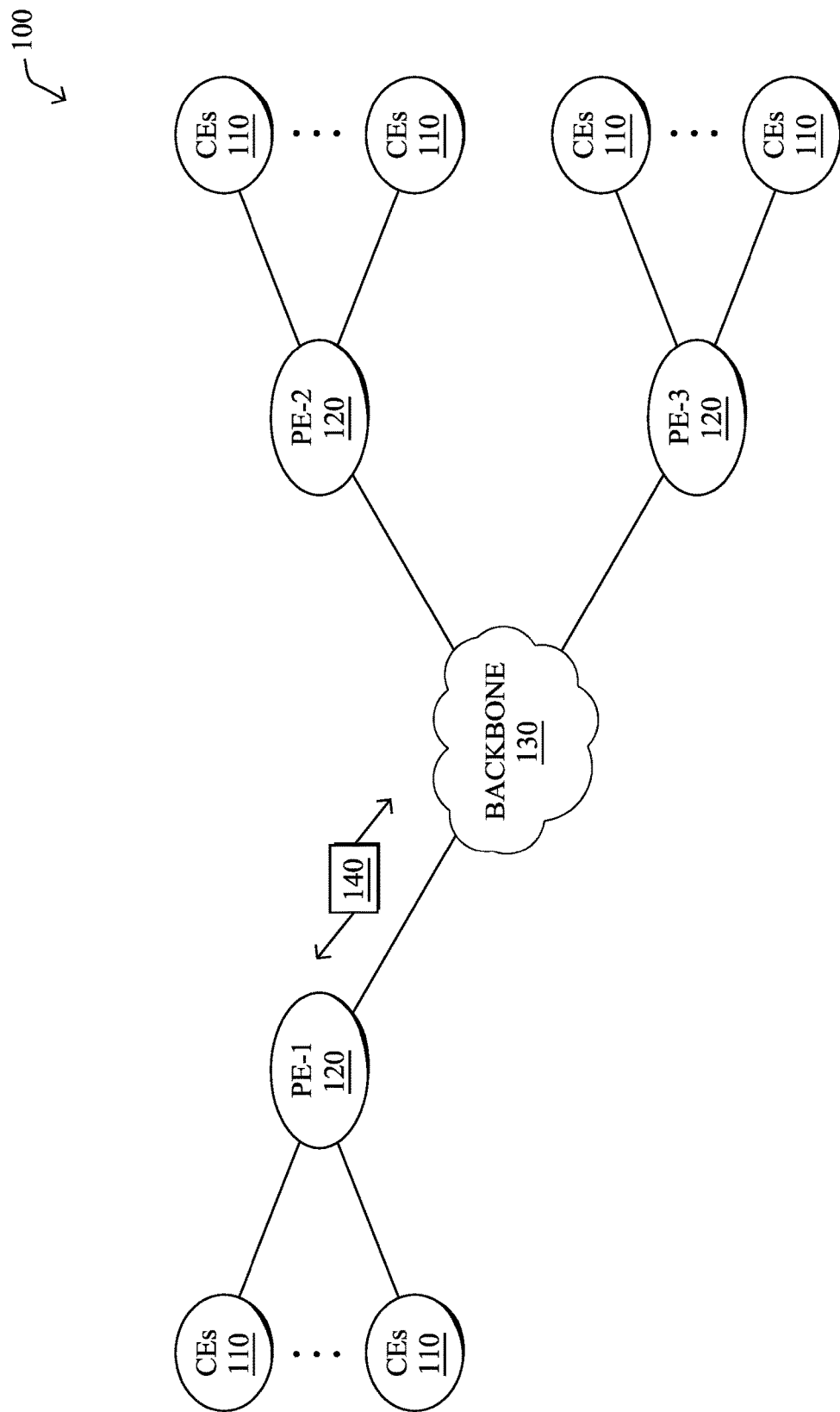
FIGS. 1A-1B illustrate an example computer network.

According to one or more embodiments of the disclosure, a machine learning model evaluation system may define standardized, extensible class hierarchies for evaluating performance of a given machine learning model. The standardized, extensible class hierarchies may include a plurality of target classes, each of which formalizes an expected output of the given machine learning model based on a given dataset, a plurality of output classes, each of which formalizes an actual output of the given machine learning model based on the given dataset, a plurality of metric classes, each of which formalizes a comparison of the expected output of the given machine learning model with the actual output of the given machine learning model, and a plurality of datasets, each of which including training data for training the given machine learning model and testing data for testing the given machine learning model. Using the standardized, extensible class hierarchies, when a machine learning model is received for evaluation, the machine learning model evaluation system may identify a target class applicable to the machine learning model among the plurality of target classes, an output class applicable to the machine learning model among the plurality of output classes, and a metric class applicable to the machine learning model among the plurality of metric classes. The machine learning model evaluation system may also retrieve a dataset among the plurality of datasets applicable to the machine learning model. Then, the machine learning model evaluation system may determine an actual output of the machine learning model based on the identified output class. The machine learning model evaluation system may also determine an expected output of the machine learning model based on the identified target class. Finally, machine learning model evaluation system may also compute one or more metrics of the machine learning model based on the identified metric class using the actual and expected outputs of the machine learning model as inputs.

Other embodiments are described below. Thus, this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/ LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B 1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
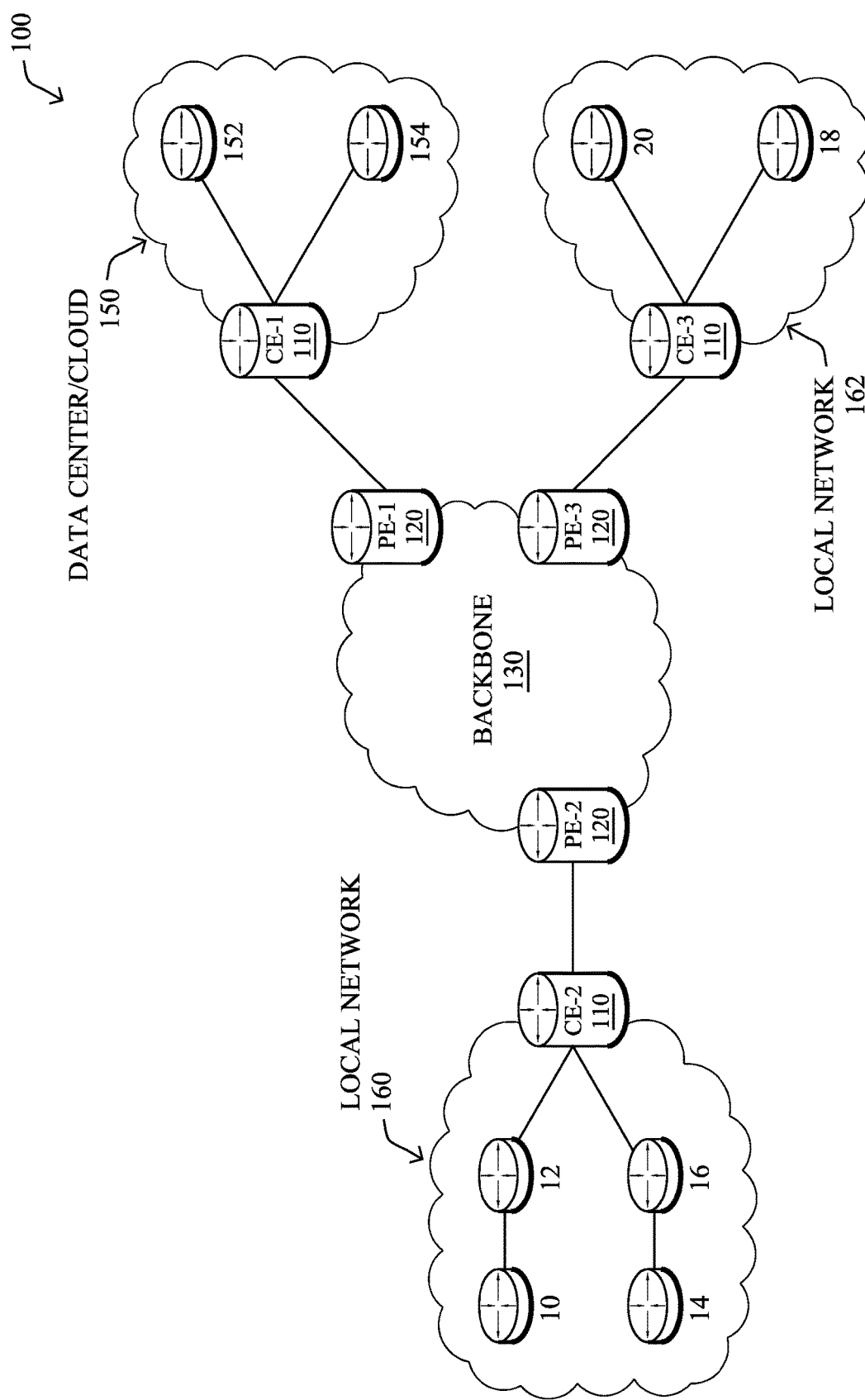

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
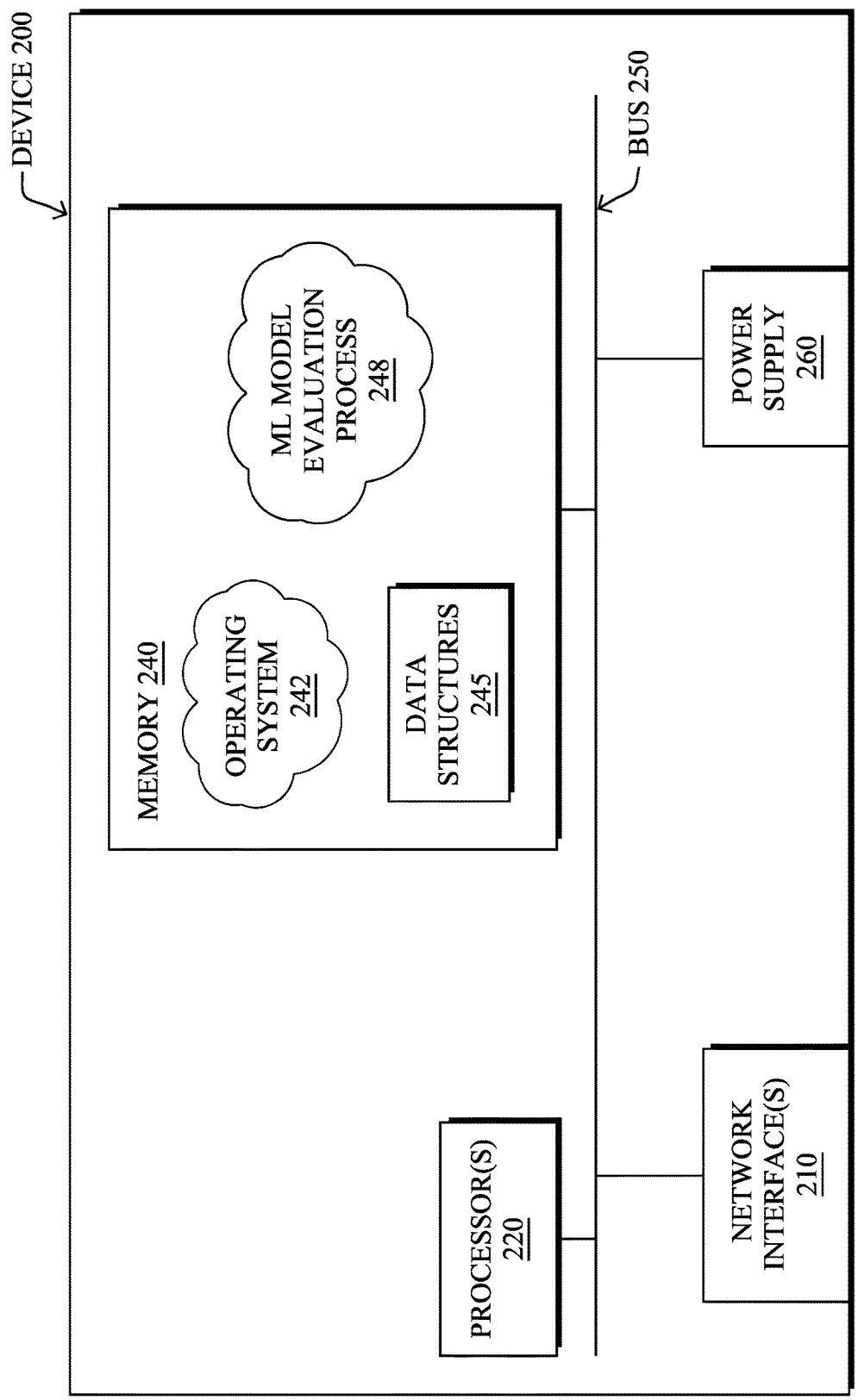
FIG. 2 illustrates an example computing device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning (ML) model evaluation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

ML model evaluation process 248 includes computer executable instructions that, when executed by processor(s) 220, cause device 200 to perform functions pertaining to machine learning model evaluation as part of a machine learning model evaluation infrastructure within the network. The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+ b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

The machine learning techniques, as described herein, may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

Figure 3:
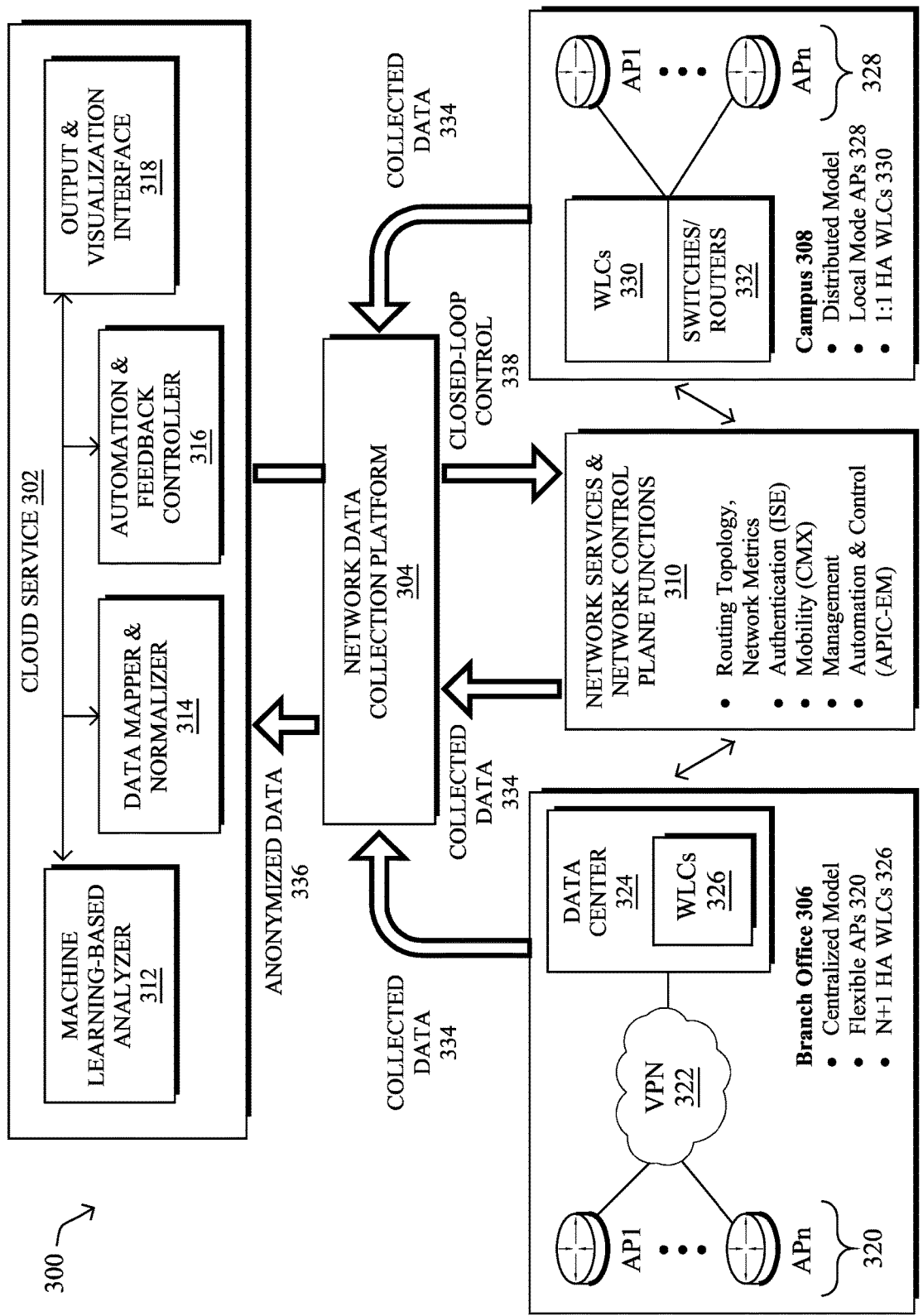
FIG. 3 illustrates an example machine learning-implemented application intelligence platform.

It is to be understood that machine learning models or algorithms, as discussed in detail herein, may be implemented to perform any number of possible tasks. As one example, without limitation, FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired networks, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform these techniques, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, the generation of a machine learning model typically entails defining a question, implementing a solution, interpreting and evaluating the results, comparing those results to other solutions, and often iterating on the question definition to begin the cycle again. Meanwhile, the process of evaluating machine learning algorithms (in the context of machine learning, the terms "algorithm" and "model" are used interchangeably herein) is widely understood to contain steps such as splitting data into training and testing sets, making predictions, and evaluating said predictions based on given metrics. Conventional experiment tracking systems generally take the approach of recording the complete set of steps taken by a human experimenter (user) during the experiment. The experimenter implements all the of the code or logic to obtain and split a dataset, train a model, use the model to get results, and then evaluate those results with certain metrics.

Problematically, the individual components of the experiment are often not easily separable, especially to a subsequent experimenter who did not create the initial experiment. This makes standardization between experimenters, and comparison of different experiments, difficult. That is, there is no robust way to know whether multiple experiments, or parts of multiple experiments, are comparable to each other without an expert examining them in detail. Consequently, these tasks become substantially more complex, error prone, and dependent on an expert parsing the experimental code.

Decomposed Machine Learning Model Evaluation System

The techniques introduced herein formalize the components of machine learning evaluation, including dataset splitting, target (label) creation, model predictions, and metric computation, as well as the interactions therebetween, to make the process of machine learning evaluation easier for the experimenter, that is, more automated, rigorous, repeatable, and convenient. In some aspects, the machine learning model evaluation system provides a structured framework to, for instance, standardize datasets for consistent, fair comparisons, define machine learning algorithm outputs and targets, standardize and compute metrics that reflect evolving research priorities, and enable comparisons and visualizations characterizing the evaluation, thus making the evaluation and iteration process faster and more rigorous, and allowing for substantial flexibility in the questions that can be asked and answered during research and evaluation of machine learning models.

Illustratively, the techniques described herein may be performed by hardware, software, and/or firmware, such as in accordance with the ML model evaluation process 248, which may include computer executable instructions executed by the processor 220 to perform functions relating to the techniques described herein.

Specifically, in one embodiment, the techniques herein may provide a machine learning model evaluation system that defines standardized, extensible class hierarchies for evaluating performance of a given machine learning model. The standardized, extensible class hierarchies may include a plurality of target classes, each of which formalizes an expected output of the given machine learning model based on a given dataset, a plurality of output classes, each of which formalizes an actual output of the given machine learning model based on the given dataset, and a plurality of metric classes, each of which formalizes a comparison of the expected output of the given machine learning model with the actual output of the given machine learning model. Using the standardized, extensible class hierarchies, when a machine learning model is received for evaluation, the machine learning model evaluation system may identify a target class applicable to the machine learning model among the plurality of target classes, an output class applicable to the machine learning model among the plurality of output classes, and a metric class applicable to the machine learning model among the plurality of metric classes. The machine learning model evaluation system may also retrieve a dataset applicable to the machine learning model. The dataset may include training data for training the machine learning model and testing data for testing the machine learning model. Then, the machine learning model evaluation system may determine an actual output of the machine learning model based on the identified output class. The machine learning model evaluation system may also determine an expected output of the machine learning model based on the identified target class. Finally, machine learning model evaluation system may also compute one or more metrics of the machine learning model based on the identified metric class using the actual and expected outputs of the machine learning model as inputs.

Operationally, the machine learning model evaluation system according to various embodiments of the present disclosure decomposes the process of machine learning evaluation into its constituent pieces and formalizes the components of machine learning evaluation into class hierarchies with defined characteristics and interaction patterns. The formally defined components of the machine learning model evaluation system described herein produce results including, but not limited to:

(1) Dataset definition and splitting are consistent across experimenters.
(2) Targets and metrics (when applicable) are computed identically, consistently, and automatically across datasets, algorithms, and experimenters. This reduces the burden on experimenters to exhaustively explore metrics and baseline comparisons manually. For example, if an experimenter creates outputs for a given set of datasets, all relevant metrics can be computed and made available automatically, including metrics of which the experimenter may be unaware.
(3) Experimenters can make comparisons to previous work (performed by themselves or others) knowing the results are comparable given the datasets and target, output, and metric classes utilized are identical.
(4) Experimenters can ask new questions about existing work by changing only the relevant component (e.g., a target or a metric) without the need to re-run experiments from scratch or to fully understand the intricacies of a previous experiment.

Figure 4:
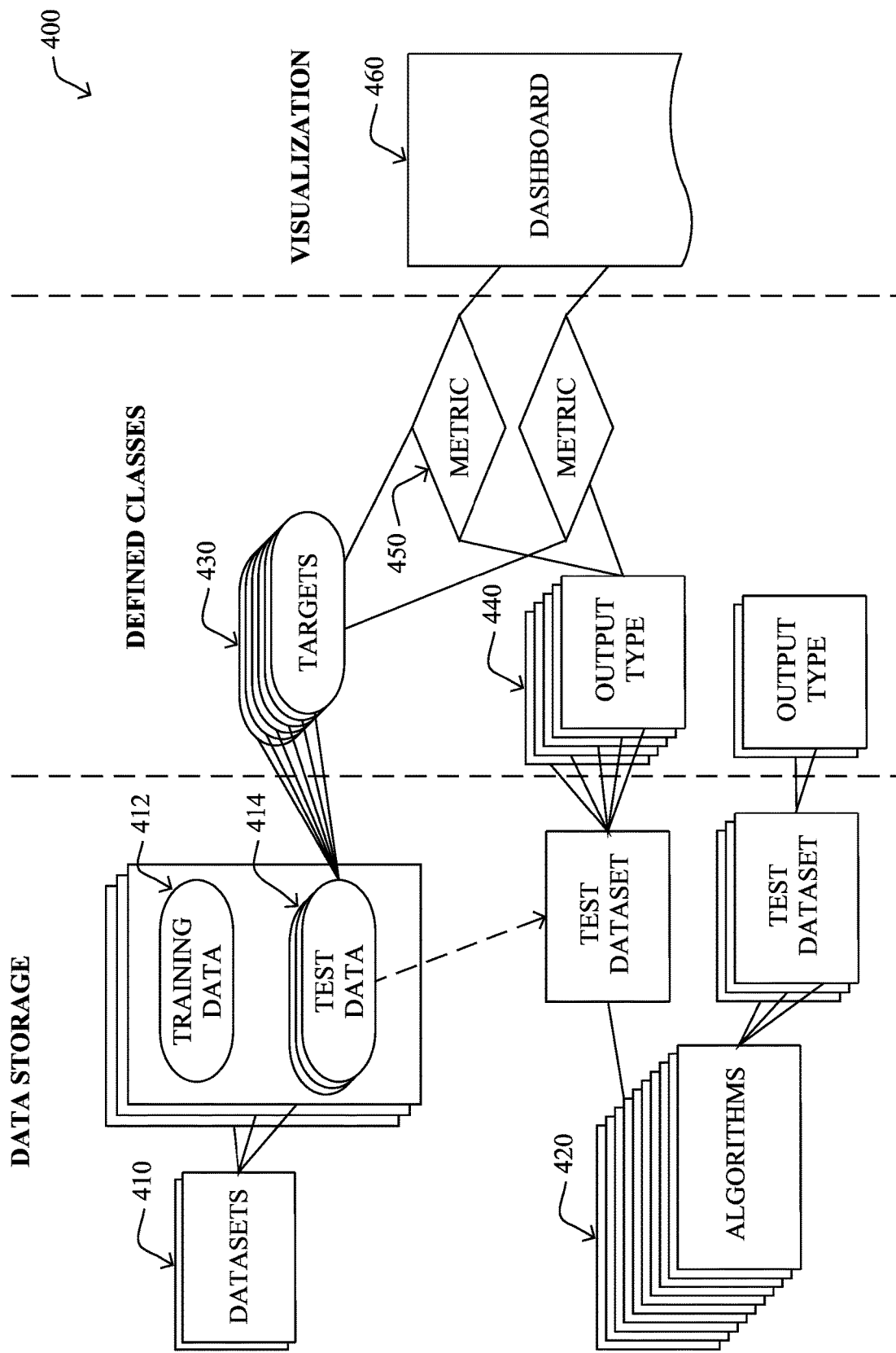
FIG. 4 illustrates an example schematic overview of a machine learning model evaluation system in accordance with one or more embodiments described herein.

With reference to FIG. 4, which illustrates an example schematic overview of a machine learning model evaluation system in accordance with one or more embodiments described herein, the machine learning model evaluation system 400 may decompose machine learning model evaluation by formalizing and tracking component or "blocks" of the evaluation process. As shown, these components of the machine learning model evaluation system 400 may include, primarily: datasets 410, machine learning algorithms (models) 420, targets 430, outputs 440, and metrics 450. In some embodiments, the machine learning model evaluation 400 may include additional components, as described herein, such as a dashboard 460. One or more operations described herein may be executed by the machine learning model evaluation system 400 (e.g., device 200), such as in accordance with the ML model evaluation process 248, which may include computer executable instructions executed by the processor 220 to perform functions relating to the techniques described herein. Some components of the machine learning model evaluation system 400: targets 430, outputs 440, and metrics 450, in particular, may be implemented or defined by the machine learning model evaluation system 400 as computer executable objects or classes, such as Python classes (within a Python class hierarchy) or the like, that can automatically verify any relevant assumptions, identify whether or not components are compatible, and automatically apply computations such as target extraction or metric computation. In some embodiments, datasets 410, as described in detail below, may also be implemented or defined by the machine learning model evaluation system 400 as computer executable objects or classes, such as Python classes (within a Python class hierarchy) or the like, that can be accessed for testing and/or training a given machine learning model in a consistent, standardized manner.

Datasets 410 may refer to one or more immutable objects, stored locally and/or remotely in a database accessible to the machine learning model evaluation system 400, containing a combination of training data 412 used for training a machine learning model 420 and testing data 414 used for testing the machine learning model 420. For a given model evaluation, the machine learning model evaluation system 400 may generate a particular dataset, representing a subset of all data in dataset 410 ("master dataset"), which includes training data 412 and testing data 414 applicable to the model 420 to be evaluated. In some embodiments, a particular dataset applicable to a particular machine learning model 420 may have exactly one training dataset 412 and at least one test dataset 414, which may include raw test data and/or permuted test data. Multiple test datasets 414 may be utilized to evaluate the machine learning model 420 multiple different ways. For example, a particular dataset may be applicable to the model 420 when the particular dataset is associated with a task the model 420 is configured to perform (e.g., based on metadata associating the dataset with the task, keywords common to the dataset and the task, etc.).

In some embodiments, the machine learning model evaluation system 400 may establish rules such that no training dataset 412 or test dataset 414 may be modified once created. However, new test datasets 414 may be added to the datasets 410 to provide new approaches for evaluating the model 420. The generation of the particular dataset applicable to the model 420 to be evaluated may be performed on-the-fly when no such dataset has previously been created. Otherwise, i.e., in a subsequent evaluation of the model 420, the machine learning model evaluation system 400 can retrieve the same dataset as previously generated such that the same training and test datasets 412 and 414 (and, optionally, any new test datasets 414) may be utilized for each evaluation of the model 420, thus ensuring consistency across all evaluations, even though the experimenters may differ.

Datasets 410 may be managed (or sub-classed) by the machine learning model evaluation system 400 to include any format of data that is divisible into training and test datasets 412 and 414, respectively, such as data frames or tabular data, most commonly. Datasets 410 may also include other data formats, such as, for example, image sets, time series, social network data, and so on.

Notably, datasets 410 may standardize the information used by an algorithm 420 an experimenter (user) wishes to evaluate. By standardizing the data used for testing and training a given machine learning model, it is possible to evaluate the algorithm 420 in different ways using the same datasets 410, thus avoiding errors in evaluation stemming from differences in dataset collection, preprocessing, or splitting. Multiple test datasets 414 may allow for a variety of questions, tasks, or output types to be evaluated based on the same training set 412. For instance, different test datasets 414 could represent different time periods after training or synthetic benchmarking data.

In some embodiments, the machine learning model evaluation system 400 may generate or track metadata about datasets 410 (as well as targets 430, outputs 440, and metrics 450), which may be used to link the machine learning model 420 to the datasets 410/targets 430/outputs 440/metrics 450 and enable the machine learning model evaluation system 400 to automatically retrieve the datasets 410/targets 430/ outputs 440/metrics 450 during any subsequent evaluation of the machine learning model 420. Furthermore, in some embodiments, the machine learning model evaluation system 400 may identify and formalize datasets 410 of interest which originate from other data tracking or storage systems.

Algorithms 420 may refer to the one or more machine learning algorithms (or models) to be evaluated by the machine learning model evaluation system 400. Whereas datasets 410 may be generated by the machine learning model evaluation system 400, algorithms 420 may instead be created to perform a task of interest by the experimenter, and provided by the experimenter to the machine learning model evaluation system 400 for testing. In some embodiments, algorithms 420 may be provided to the machine learning model evaluation system 400 via an outside model tracking or pipeline system.

The machine learning model evaluation system 400 may train the algorithms 420 using the training dataset 412. Then, algorithms 420 may be executed using the test dataset(s) 414 as input to create a set of outputs, that is, the actual output of the machine learning model 420. As such, algorithms 420 may be considered a collection of outputs 440 produced from the same modeling process (e.g., same training process, identical hyperparameters, etc.). In some cases, the outputs 440 may be useful for evaluating the performance of the model 420 of interest. As an example, assume a machine learning model predicts a fraud risk score as an output using a given test dataset as input. The fraud risk score output by the machine learning model may be compared to other proxies of risk (e.g., targets 430) to get a measure of the model's performance, as described in further detail below.

Targets 430 may refer to the formalization of what a machine learning model 420 is expected to predict (e.g., labels) based on a given test dataset 414. Put another way, targets 430 may include information extracted from test dataset 414 that serves as "truth" for the computation of metrics 450. As such, targets 430 may represent the expected output of machine learning model 420, that is, the value(s) the model 420 is supposed to predict assuming the model 420 operates with perfect accuracy. Targets 430 may characterize the expected output of the machine learning model 420 by transforming test dataset 414 into one or more prediction targets.

Targets 430 may be useful for coordination between metrics 450 and algorithm outputs 440. That is, targets 430 may provide a way of specifying differing semantics of similar outputs 440. For instance, an algorithm 420 may predict a probability that should only be interpreted relative to a particular target 430. Targets 430 may also represent the minimum information needed from datasets 410 for the computation of metrics 450.

Furthermore, targets 430 may include target classes (e.g., extensible Python classes) defined by the machine learning model evaluation system 400. The defined target classes may embody functions which can be applied to the test dataset 414 to extract the expected output of the machine learning model 420. The machine learning model evaluation system 400 may execute the target classes in order to determine the expected output of the machine learning model 420. In some embodiments, a target class may validate whether it is applicable (i.e., able to be properly applied) to a particular test dataset 414. The target class may also define and check restrictions on valid values. As an example, a target class known as "BooleanTarget" target class might extract a column from datasets 410 with a particular label (e.g., "is_fraud") and validate that the extracted values are Boolean (i.e., true/false) values. The class hierarchy of targets 430 may also provide for subclasses. In the case of the "BooleanTarget" target class, subclasses thereof may extract different columns or functions of datasets 410 so long as the returned values are Boolean. As another example, a target class known as "NotSuccess" target class may return a Boolean value for each authentication of test dataset 414 indicating whether the authentication was successful. Again, the "NotSuccess" target class may validate that the extracted values include only Boolean values.

Outputs 440, as mentioned briefly above, may refer to the formalizations of actual predictions made by machine learning algorithms 420 during testing (based on test datasets 414). As such, outputs 440 may represent the actual output of machine learning algorithms 420 when given test dataset(s) 414 as input.

Like targets 430, outputs 440 may include output classes (e.g., extensible Python classes) defined by the machine learning model evaluation system 400. Notably, the defined output classes may standardize expectations for what algorithms 420 should generate as their output for test dataset 414, covering both semantic and syntactic standards and constraints. The machine learning model evaluation system 400 may execute the output classes in order to determine the actual output of the machine learning model 420. The defined output classes may also validate that a particular set of values created by algorithms 420 match the requirements for that output type. More specifically, the output classes may verify whether or not output of the machine learning model 420 satisfies one or more requirements for a type of output associated with the model 420 and/or the task to be performed by the model 420. As an example, assume the machine learning model 420 predicts a probability of fraud as an output using a given test dataset as input. A "ProbabilityOutput" output class may specify and enforce that values must be indicative of a probability, i.e., a value between 0 and 1. In some embodiments, an output class can be selected by the machine learning model evaluation system 400 to match the selected target class. In other embodiments, an output class can be generally selected by the machine learning model evaluation system 400, i.e., without regard for the selected target class.

Metrics 450 may refer to formalizations of computations characterizing a comparison of targets 430 (i.e., expected output of algorithms 420) and outputs 440 (i.e., actual output of algorithms 420). Particularly, metrics 450 may receive the extracted targets 430 and model outputs 440, and then generate some comparative measurement that can be used for evaluation of the algorithms 420. Notably, because metrics 430 and outputs 440 are pre-defined and standardized, in the manner described above, metrics 450 may be reproducible and comparable across multiple evaluations of algorithms 420 by different experimenters.

Like targets 430 and outputs 440, metrics 450 may include metrics classes (e.g., extensible Python classes) defined by the machine learning model evaluation system 400. The machine learning model evaluation system 400 may execute the metric classes in order to compute the one or more metrics of the machine learning model 420 using the actual and expected outputs of the machine learning model 420 as inputs. In some embodiments, the metric classes may verify the validity of target and output classes, and therefore, may determine whether a metric is applicable given a set of existing targets and outputs. As an example, an "ROCMetric" metric class may require a valid "BooleanTarget" as target 430 and a valid "ProbabilityOutput" as output 440 in order to produce an ROC curve, whereby the ROC curve (metric) characterizes a comparison of the target 430 and the output 440. Metrics 450 may include any variety of metric suitable for characterizing a comparison of targets 430 and outputs 440 including, but not limited to, precision and recall, accuracy, calibration, goodness of fit, an ROC curves, a confusion matrix, and so on.

In some embodiments, the machine learning model evaluation system 400 may utilize the metrics 450 as input to generate visualizations characterizing the performance of the machine learning model 420. For example, a dashboard 460 may be communicatively coupled to the metrics 450 component of the machine learning model evaluation system 400 and may collect any number of metrics 450 produced during a given evaluation. The dashboard 460 may use the collected metrics 450 to produce one or more visualizations illustrating a comparison of the targets 430 and the outputs 440, thus characterizing the performance (i.e., accuracy) of the machine learning model 420.

The arrows in FIG. 4 represent formalized interfaces between the aforementioned components that can be managed by the machine learning model evaluation system 400. This may allow an experimenter to modify or add a single component that can automatically interface with the existing components. For instance, adding a new output 440 can trigger the computation of all appropriate metrics 450 against all appropriate targets 430.

Notably, by way of the architecture described above, the machine learning model evaluation system 400 introduces an "evaluation layer" (datasets 410, targets 430, outputs 440, and metrics 450) separate from the modeling logic (algorithms 420). This means that the machine learning algorithms 420 to be evaluated is effectively divided from the standardized and shared dataset creation and evaluation of model outputs. The machine learning model evaluation system 400 may provide an application programming interface (API) that connects the unrestricted modeling logic (algorithms 420) created by the experimenter to the shared concepts and resources in the aforementioned evaluation layer.

In some embodiments, the evaluation layer (datasets 410, targets 430, outputs 440, and metrics 450) may be managed in a manner differently and separately from the modeling logic (algorithms 420). In this regard, the machine learning model evaluation system 400 may share the evaluation layer such that datasets 410, targets 430, outputs 440, and metrics 450 are accessible to a plurality of users during evaluation of the machine learning model 420. Furthermore, the machine learning model evaluation system 400 may restrict the evaluation layer such that datasets 410, targets 430, outputs 440, and metrics 450 are unalterable by the plurality of users during evaluation of the machine learning model 420. On the other hand, the machine learning model 420 may be alterable, that is, unrestricted, by experimenters as desired.

Additionally, in some embodiments, components of the evaluation layer (datasets 410, targets 430, outputs 440, and metrics 450) of the machine learning model evaluation system 400 may be represented within a Python class hierarchy. In such case, the Python classes may be easily extensible as targets 430, outputs 440, and metrics 450 evolve.

Figure 5:
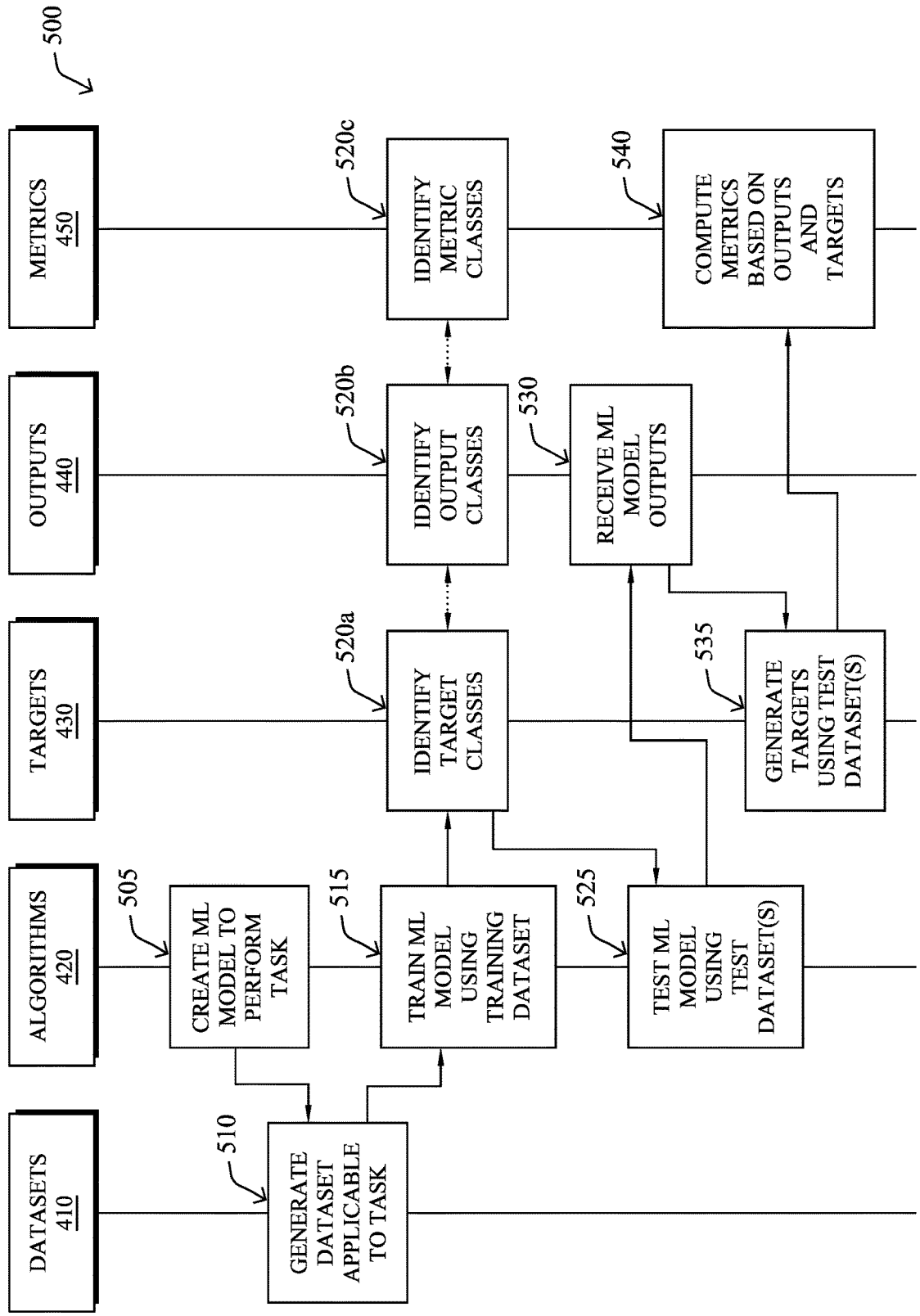
FIG. 5 illustrates an example workflow of the machine learning model evaluation system.

Referring next to FIG. 5, which illustrates an example workflow 500 of the machine learning model evaluation system 400, the workflow 500 may commence with an experimenter creating a machine learning model 420 configured to perform a task and providing the model 420 to the machine learning model evaluation system 400 (step 505). Then, the machine learning model evaluation system 400 may be queried to retrieve the shared datasets 410 applicable to the task to be performed (step 510). The retrieved datasets 410 may include one training dataset 412 and one or more test datasets 414, as described above.

The machine learning model 420 may be trained using the training dataset 412 (step 515) and then tested using the one or more testing datasets 414 (step 525). In the meantime, the machine learning model evaluation system 400 may identify the target classes (step 520*a*), output classes (step 520*b*), and metric classes (step 520*c*) applicable to the evaluation at hand. As noted above, the target/output/metric classes may be deemed applicable to the evaluation at hand when the classes are associated with a task the model 420 is configured to perform (e.g., based on metadata associating the dataset with the task, keywords common to the dataset and the task, etc.). In the event of a new machine learning model 420, or a new task to be performed by the machine learning model 420, the machine learning model evaluation system 400 create or extend existing classes as necessary, which may be available for future experimenters working on similar problems.

The outputs of machine learning model 420 ("ML model outputs") may be received or registered by the machine learning model evaluation system 400 (step 530). Meanwhile, the machine learning model evaluation system 400 may determine which targets 430 are applicable to the ML model outputs and then generate the targets 430 based on test dataset 414 (step 535). At this point, the machine learning model evaluation system 400 may collect all targets 430 and outputs 440 and compute metrics 450 accordingly (step 540). Metrics 450 may be evaluated programmatically or via a dashboard (e.g., dashboard 460) to identify the strengths and weaknesses of the algorithm 420 relative to predefined baselines and/or previous work.

It should be noted that certain steps within workflow 500 may be optional. Thus, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Figure 6:
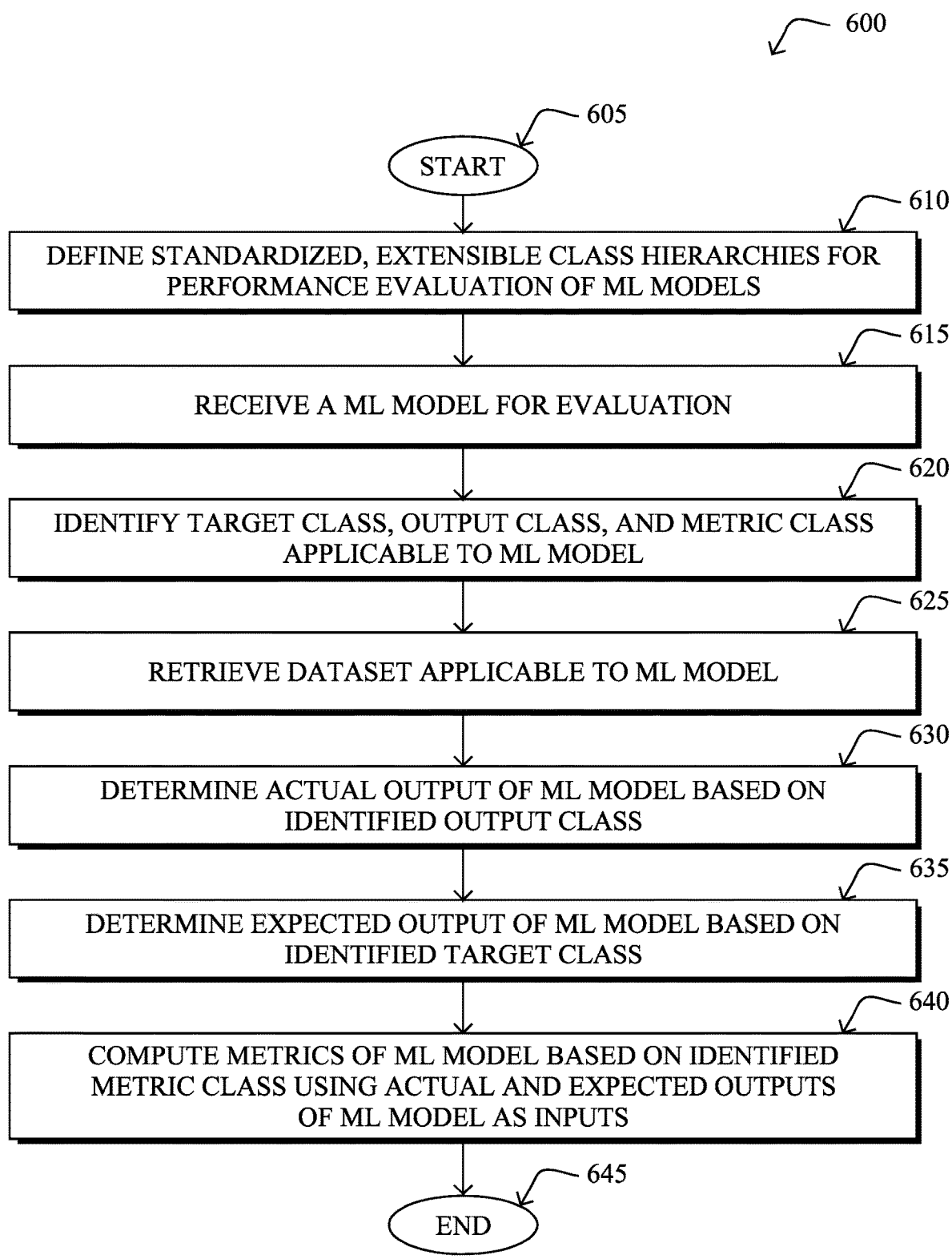
FIG. 6 illustrates an example simplified procedure for decomposed machine learning model evaluation in accordance with one or more embodiments described herein.

In closing, FIG. 6 illustrates an example simplified procedure for decomposed machine learning model evaluation in accordance with one or more embodiments described herein. For example, a non-generic, specifically configured device (e.g., device 200) may perform procedure 600 by executing stored instructions (e.g., ML model evaluation process 248). The procedure 600 may start at step 605, and continues to step 610, where, as described in greater detail above, the techniques herein formalize the components of machine learning model evaluation, as well as their respective inputs and outputs, into a set of standardized, extensible classes with defined interactions between them.

In step 610, the machine learning model evaluation system 400 may define standardized, extensible class hierarchies for evaluating performance of a given machine learning model. In particular, the standardized, extensible class hierarchies may include a plurality of target classes (targets 430), a plurality of output classes (outputs 440), and a plurality of metric classes (metrics 450). Targets 430 may be configured to formalize an expected output of the given machine learning model based on a given dataset, as explained above. Furthermore, outputs 440 may be configured to formalize an actual output of the given machine learning model based on the given dataset. Furthermore, metrics 450 may be configured to formalize a comparison of the expected output of the given machine learning model with the actual output of the given machine learning model. These components of the machine learning model evaluation system 400 may be implemented or defined as computer executable objects or classes, such as Python classes (within a Python class hierarchy) or the like.

In step 615, the machine learning model evaluation system 400 may receive a machine learning model 420 for evaluation. The machine learning model 420 may be created by an experimenter. In some embodiments, the machine learning model 420 may be evaluated by the machine learning model evaluation system 400 for the first time, in which case the machine learning model evaluation system 400 may create or extend existing classes as necessary. In other embodiments, the machine learning model 420 may have been previously evaluated by the machine learning model evaluation system 400, in which case the machine learning model evaluation system 400 may automatically retrieve datasets 410, targets 430, outputs 440, and metrics 450 used in any previous evaluations.

In step 620, the machine learning model evaluation system 400 may identify a target class among the plurality of target classes (targets 430) that is applicable to the machine learning model 420. The machine learning model evaluation system 400 may also identify an output class among the plurality of output classes (outputs 440) that is applicable to the machine learning model 420. The machine learning model evaluation system 400 may also identify a metric class among the plurality of metric classes (metrics 450) that is applicable to the machine learning model 420. As explained above, the targets 430/outputs 440/metrics 450 may be considered applicable to the model 420 when such components are associated with the model 420 or a task the model 420 is configured to perform (e.g., based on metadata associating the components with the model or task, keywords common to the components and the model or task, etc.).

In step 625, the machine learning model evaluation system 400 may retrieve a dataset 410 applicable to the machine learning model 420. As explained above, the dataset 410 may represent a subset of all data in dataset 410 ("master dataset"), which includes training data 412 and testing data 414 applicable to the model 420 to be evaluated. In some embodiments, a particular dataset applicable to a particular machine learning model 420 may have exactly one training dataset 412 and at least one test dataset 414, which may include raw test data and/or permuted test data. Dataset 410 may be considered applicable to the model 420 when it is associated with the model 420 or a task the model 420 is configured to perform (e.g., based on metadata associating the dataset with the model or task, keywords common to the dataset and the model or task, etc.).

In step 630, the machine learning model evaluation system 400 may determine the actual output of the machine learning model 420 based on the output class identified in step 620. To this end, the machine learning model evaluation system 400 may execute the identified output (Python) class to determine the actual output of the machine learning model 420. As noted above, outputs 440 may refer to the formalizations of actual predictions made by machine learning algorithms 420 during testing (based on test datasets 414).

In step 635, the machine learning model evaluation system 400 may determine the expected output of the machine learning model 420 based on the target class identified in step 620. To this end, the machine learning model evaluation system 400 may execute the identified target (Python) class to determine the expected output of the machine learning model 420. As noted above, targets 430 may refer to the formalization of what the machine learning model 420 is expected to predict (e.g., labels) based on a given test dataset 414. Put another way, targets 430 may include information extracted from test dataset 414 that serves as "truth" for the computation of metrics 450. As such, targets 430 may characterize the expected output of the machine learning model 420 by transforming test dataset 414 into one or more prediction targets.

In step 640, the machine learning model evaluation system 400 may compute one or more metrics of the machine learning model based on the metric class identified in step 620 using the actual and expected outputs of the machine learning model 420 as inputs. To this end, the machine learning model evaluation system 400 may execute the identified metric (Python) class to compute the metric(s) of the machine learning model 420. As noted above, metrics 440 may refer to the formalizations of computations characterizing a comparison of targets 430 (i.e., expected output of machine learning model 420) and outputs 440 (i.e., actual output of machine learning model 420). Particularly, metrics 450 may receive the extracted targets 430 and model outputs 440, and then generate some comparative measurement that can be used for evaluation of the machine learning model 420. Procedure 600 then ends at step 645.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a decomposed machine learning model evaluation system that formalizes and automates comparisons of machine learning models, thus ensuring consistency across machine learning model experiments performed by myriad different experimenters. The decomposed machine learning model evaluation system may manage reference data, record outputs, define and standardize metrics, and enforce process within a single framework, resulting in a machine learning model evaluation process that is easier and more rigorous than possible in conventional systems. By virtue of such system, an experimenter can compare a machine learning model evaluation to a prior evaluation with confidence about which things are scientifically valid to compare, improving the validity and collaboration of such evaluations. The same experimenter can also compare the machine learning model evaluation to a set of baselines, or across a large set of shared metrics, without the experimenter necessarily knowing and remembering to compute each metric individually.

According to the embodiments herein, a method herein may comprise: defining, by a machine learning model evaluation system, standardized, extensible class hierarchies for evaluating performance of a given machine learning model, wherein the standardized, extensible class hierarchies include: 1) a plurality of target classes, each of which formalizing an expected output of the given machine learning model based on a given dataset, 2) a plurality of output classes, each of which formalizing an actual output of the given machine learning model based on the given dataset, and 3) a plurality of metric classes, each of which formalizing a comparison of the expected output of the given machine learning model with the actual output of the given machine learning model; receiving, at the machine learning model evaluation system, a machine learning model for evaluation; identifying, by the machine learning model evaluation system, a target class applicable to the machine learning model among the plurality of target classes, an output class applicable to the machine learning model among the plurality of output classes, and a metric class applicable to the machine learning model among the plurality of metric classes; retrieving, by the machine learning model evaluation system, a dataset applicable to the machine learning model, the dataset including training data for training the machine learning model and testing data for testing the machine learning model; determining, by the machine learning model evaluation system, an actual output of the machine learning model based on the identified output class; determining, by the machine learning model evaluation system, an expected output of the machine learning model based on the identified target class; and computing, by the machine learning model evaluation system, one or more metrics of the machine learning model based on the identified metric class using the actual and expected outputs of the machine learning model as inputs.

In one embodiment, the method may further comprise defining, by the machine learning model evaluation system, an evaluation layer, which includes the retrieved dataset, the identified target class, the identified output class, and the identified metric class, and a modeling logic layer, which includes the machine learning model, wherein the evaluation layer and the modeling logic layer are connected to each other via an application programming interface (API). In one embodiment, the method may further comprise sharing, by the machine learning model evaluation system, the evaluation layer such that the retrieved dataset, the identified target class, the identified output class, and the identified metric class are accessible to a plurality of users during evaluation of the machine learning model. In one embodiment, the method may further comprise restricting, by the machine learning model evaluation system, the evaluation layer such that the retrieved dataset, the identified target class, the identified output class, and the identified metric class are unalterable by the plurality of users during evaluation of the machine learning model. In one embodiment, the method may further comprise executing, by the machine learning model evaluation system, the identified output class to determine the actual output of the machine learning model; executing, by the machine learning model evaluation system, the identified target class to determine the expected output of the machine learning model; and executing, by the machine learning model evaluation system, the identified metric class to compute the one or more metrics of the machine learning model using the actual and expected outputs of the machine learning model as inputs. In one embodiment, the method may further comprise, when the machine learning model is received for a subsequent evaluation, automatically retrieving, by the machine learning model evaluation system, the identified target class, the identified output class, the identified metric class, and the retrieved dataset for the subsequent evaluation of the machine learning model. In one embodiment, the method may further comprise generating, by the machine learning model evaluation system, metadata linking the machine learning model to each of the retrieved dataset, the identified target class, the identified output class, and the identified metric class. In one embodiment, the dataset may include exactly one set of the training data and a plurality of sets of the testing data. In one embodiment, the plurality of target classes may be configured to transform the testing data into one or more prediction targets. In one embodiment, the plurality of output classes may be configured to verify whether or not the actual output of the machine learning model satisfies one or more requirements for a type of output associated with the machine learning model. In one embodiment, the retrieving of the dataset may comprise, when the machine learning model evaluation system has previously evaluated the machine learning model, retrieving, by the machine learning model evaluation system, a dataset used in the previous evaluation of the machine learning model. In one embodiment, the retrieving of the dataset may comprise, when the machine learning model evaluation system has not previously evaluated the machine learning model, creating, by the machine learning model evaluation system, a new dataset by identifying data in a master dataset that is applicable to the machine learning model, wherein the new dataset is a subset of the master dataset. In one embodiment, the method may further comprise generating, by a dashboard of the machine learning model evaluation system, one or more visualizations characterizing the one or more metrics of the machine learning model. In one embodiment, the retrieving of the dataset may comprise identifying, by the machine learning model evaluation system, data in a master dataset that is applicable to the machine learning model, wherein the retrieved dataset is a subset of the master dataset. In one embodiment, the plurality of target classes, the plurality of output classes, and the plurality of metric classes may be implemented as extensible Python classes.

According to the embodiments herein, a tangible, non-transitory, computer-readable medium herein may have computer-executable instructions stored thereon that, when executed by a processor on a computer, may cause the computer to perform a method comprising: defining standardized, extensible class hierarchies for evaluating performance of a given machine learning model, wherein the standardized, extensible class hierarchies include: 1) a plurality of target classes, each of which formalizing an expected output of the given machine learning model based on a given dataset, 2) a plurality of output classes, each of which formalizing an actual output of the given machine learning model based on the given dataset, and 3) a plurality of metric classes, each of which formalizing a comparison of the expected output of the given machine learning model with the actual output of the given machine learning model; receiving a machine learning model for evaluation; identifying a target class applicable to the machine learning model among the plurality of target classes, an output class applicable to the machine learning model among the plurality of output classes, and a metric class applicable to the machine learning model among the plurality of metric classes; retrieving a dataset applicable to the machine learning model, the dataset including training data for training the machine learning model and including testing data for testing the machine learning model; determining an actual output of the machine learning model based on the identified output class; determining an expected output of the machine learning model based on the identified target class; and computing one or more metrics of the machine learning model based on the identified metric class using the actual and expected outputs of the machine learning model as inputs.

Further, according to the embodiments herein an apparatus herein may comprise: one or more network interfaces to communicate with a network; a processor of a machine learning model evaluation system coupled to the network interfaces and configured to execute one or more processes; and a memory configured to store a process executable by the processor, wherein the process, when executed, is configured to: define standardized, extensible class hierarchies for evaluating performance of a given machine learning model, wherein the standardized, extensible class hierarchies include: 1) a plurality of target classes, each of which formalizing an expected output of the given machine learning model based on a given dataset, 2) a plurality of output classes, each of which formalizing an actual output of the given machine learning model based on the given dataset, and 3) a plurality of metric classes, each of which formalizing a comparison of the expected output of the given machine learning model with the actual output of the given machine learning model; receive a machine learning model for evaluation; identify a target class applicable to the machine learning model among the plurality of target classes, an output class applicable to the machine learning model among the plurality of output classes, and a metric class applicable to the machine learning model among the plurality of metric classes; retrieve a dataset applicable to the machine learning model, the dataset including training data for training the machine learning model and including testing data for testing the machine learning model; determine an actual output of the machine learning model based on the identified output class; determine an expected output of the machine learning model based on the identified target class; and compute one or more metrics of the machine learning model based on the identified metric class using the actual and expected outputs of the machine learning model as inputs.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

While certain aspects of the present disclosure are described in terms of being performed "by a machine learning model evaluation system," those skilled in the art will appreciate that the techniques described herein may be generally applied to any suitable software/hardware configuration (libraries, modules, etc.) as part of an apparatus, processor, computer, device, server, or otherwise. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   defining, by a machine learning model evaluation system, standardized, extensible class hierarchies for evaluating performance of a given machine learning model, wherein the standardized, extensible class hierarchies include:
   a.) a plurality of target classes, each of which formalizing an expected output of the given machine learning model based on a given dataset,
   b.) a plurality of output classes, each of which formalizing an actual output of the given machine learning model based on the given dataset,
   c.) a plurality of metric classes, each of which formalizing a comparison of the expected output of the given machine learning model with the actual output of the given machine learning model, and
   d.) a plurality of datasets, each of which including training data for training the given machine learning model and testing data for testing the given machine learning model;
   receiving, at the machine learning model evaluation system, a machine learning model;
   identifying, by the machine learning model evaluation system, a target class applicable to the machine learning model among the plurality of target classes, an output class applicable to the machine learning model among the plurality of output classes, and a metric class applicable to the machine learning model among the plurality of metric classes;
   retrieving, by the machine learning model evaluation system, a dataset among the plurality of datasets applicable to the machine learning model;
   determining, by the machine learning model evaluation system, an actual output of the machine learning model based on the identified output class;
   determining, by the machine learning model evaluation system, an expected output of the machine learning model based on the identified target class; and
   computing, by the machine learning model evaluation system, one or more metrics of the machine learning model based on the identified metric class using the actual and expected outputs of the machine learning model as inputs.

2. A method as in claim 1, further comprising:
   defining an evaluation layer, which includes the retrieved dataset, the identified target class, output class, and metric class, and a modeling logic layer, which includes the machine learning model, wherein the evaluation layer and the modeling logic layer are connected to each other via an application programming interface (API).

3. A method as in claim 2, further comprising:
   sharing, by the machine learning model evaluation system, the evaluation layer such that the retrieved dataset, the identified target class, the identified output class, and the identified metric class are accessible to a plurality of users during evaluation of the machine learning model.

4. A method as in claim 3, further comprising:
   restricting, by the machine learning model evaluation system, the evaluation layer such that the retrieved dataset, the identified target class, the identified output class, and the identified metric class are unalterable by the plurality of users during evaluation of the machine learning model.

5. A method as in claim 1, further comprising:
   executing, by the machine learning model evaluation system, the identified output class to determine the actual output of the machine learning model;
   executing, by the machine learning model evaluation system, the identified target class to determine the expected output of the machine learning model; and
   executing, by the machine learning model evaluation system, the identified metric class to compute the one or more metrics of the machine learning model using the actual and expected outputs of the machine learning model as inputs.

6. A method as in claim 1, further comprising, when the machine learning model is received for a subsequent evaluation:
   automatically retrieving, by the machine learning model evaluation system, the identified target class, the identified output class, the identified metric class, and the retrieved dataset for the subsequent evaluation of the machine learning model.

7. A method as in claim 1, further comprising:
   generating, by the machine learning model evaluation system, metadata linking the machine learning model to each of the retrieved dataset, the identified target class, the identified output class, and the identified metric class.

8. A method as in claim 1, wherein the dataset includes exactly one set of the training data and a plurality of sets of the testing data.

9. A method as in claim 1, wherein the plurality of target classes are configured to transform the testing data into one or more prediction targets.

10. A method as in claim 1, wherein the plurality of output classes are configured to verify whether or not the actual output of the machine learning model satisfies one or more requirements for a type of output associated with the machine learning model.

11. A method as in claim 1, wherein, when the machine learning model evaluation system has previously evaluated the machine learning model, the retrieving of the dataset comprises:
    retrieving, by the machine learning model evaluation system, a dataset used in the previous evaluation of the machine learning model.

12. A method as in claim 1, wherein, when the machine learning model evaluation system has not previously evaluated the machine learning model, the retrieving of the dataset comprises:
    creating, by the machine learning model evaluation system, a new dataset by identifying data in a master dataset that is applicable to the machine learning model, wherein the new dataset is a subset of the master dataset.

13. A method as in claim 1, further comprising:
generating, by a dashboard of the machine learning model evaluation system, one or more visualizations characterizing the one or more metrics of the machine learning model.

14. A method as in claim 1, wherein the retrieving of the dataset comprises:
identifying, by the machine learning model evaluation system, data in a master dataset that is applicable to the machine learning model, wherein the retrieved dataset is a subset of the master dataset.

15. A method as in claim 1, wherein the plurality of target classes, the plurality of output classes, and the plurality of metric classes are implemented as extensible Python classes.

16. An apparatus, comprising:
one or more network interfaces to communicate with a network;
a processor of a machine learning model evaluation system coupled to the network interfaces and configured to execute one or more processes; and
a memory configured to store a process executable by the processor, wherein the process, when executed, is configured to:
define standardized, extensible class hierarchies for evaluating performance of a given machine learning model, wherein the standardized, extensible class hierarchies include:
a.) a plurality of target classes, each of which formalizing an expected output of the given machine learning model based on a given dataset,
b.) a plurality of output classes, each of which formalizing an actual output of the given machine learning model based on the given dataset,
c.) a plurality of metric classes, each of which formalizing a comparison of the expected output of the given machine learning model with the actual output of the given machine learning model, and
d.) a plurality of datasets, each of which including training data for training the given machine learning model and testing data for testing the given machine learning model;
receive a machine learning model for evaluation;
identify a target class applicable to the machine learning model among the plurality of target classes, an output class applicable to the machine learning model among the plurality of output classes, and a metric class applicable to the machine learning model among the plurality of metric classes;
retrieve a dataset among the plurality of datasets applicable to the machine learning model;
determine an actual output of the machine learning model based on the identified output class;
determine an expected output of the machine learning model based on the identified target class; and
compute one or more metrics of the machine learning model based on the identified metric class using the actual and expected outputs of the machine learning model as inputs.

17. The apparatus as in claim 16, wherein the process, when executed, is further configured to:
define an evaluation layer, which includes the retrieved dataset, the identified target class, the identified output class, and the identified metric class, and a modeling logic layer, which includes the machine learning model, wherein the evaluation layer and the modeling logic layer are connected to each other via an application programming interface (API);
share the evaluation layer such that the retrieved dataset, the identified target class, the identified output class, and the identified metric class are accessible to a plurality of users during evaluation of the machine learning model; and
restrict the evaluation layer such that the retrieved dataset, the identified target class, the identified output class, and the identified metric class are unalterable by the plurality of users during evaluation of the machine learning model.

18. The apparatus as in claim 16, wherein the process, when executed, is further configured to:
execute the identified output class to determine the actual output of the machine learning model;
execute the identified target class to determine the expected output of the machine learning model; and
execute the identified metric class to compute the one or more metrics of the machine learning model using the actual and expected outputs of the machine learning model as inputs.

19. The apparatus as in claim 16, wherein the process, when executed, is further configured to:
automatically retrieve the identified target class, the identified output class, the identified metric class, and the retrieved dataset when the machine learning model is received for a subsequent evaluation.

20. A tangible, non-transitory, computer-readable medium having computer-executable instructions stored thereon that, when executed by a processor on a computer, cause the computer to perform a method comprising:
defining standardized, extensible class hierarchies for evaluating performance of a given machine learning model, wherein the standardized, extensible class hierarchies include:
a.) a plurality of target classes, each of which formalizing an expected output of the given machine learning model based on a given dataset,
b.) a plurality of output classes, each of which formalizing an actual output of the given machine learning model based on the given dataset,
c.) a plurality of metric classes, each of which formalizing a comparison of the expected output of the given machine learning model with the actual output of the given machine learning model, and
d.) a plurality of datasets, each of which including training data for training the given machine learning model and testing data for testing the given machine learning model;
receiving a machine learning model for evaluation;
identifying a target class applicable to the machine learning model among the plurality of target classes, an output class applicable to the machine learning model among the plurality of output classes, and a metric class applicable to the machine learning model among the plurality of metric classes;
retrieving a dataset among the plurality of datasets applicable to the machine learning model;
determining an actual output of the machine learning model based on the identified output class;
determining an expected output of the machine learning model based on the identified target class; and
computing one or more metrics of the machine learning model based on the identified metric class using the actual and expected outputs of the machine learning model as inputs.

* * * * *